3,057,735
PRESERVATION OF MEAT
Robert Crittenden Ottke, Huntington Station, N.Y., and Charles Franklin Niven, Jr., Chicago, Ill., assignors to Chas. Pfizer & Co., Inc., New York, N.Y., a corporation of Delaware
Filed Jan. 25, 1957, Ser. No. 636,422
13 Claims. (Cl. 99—157)

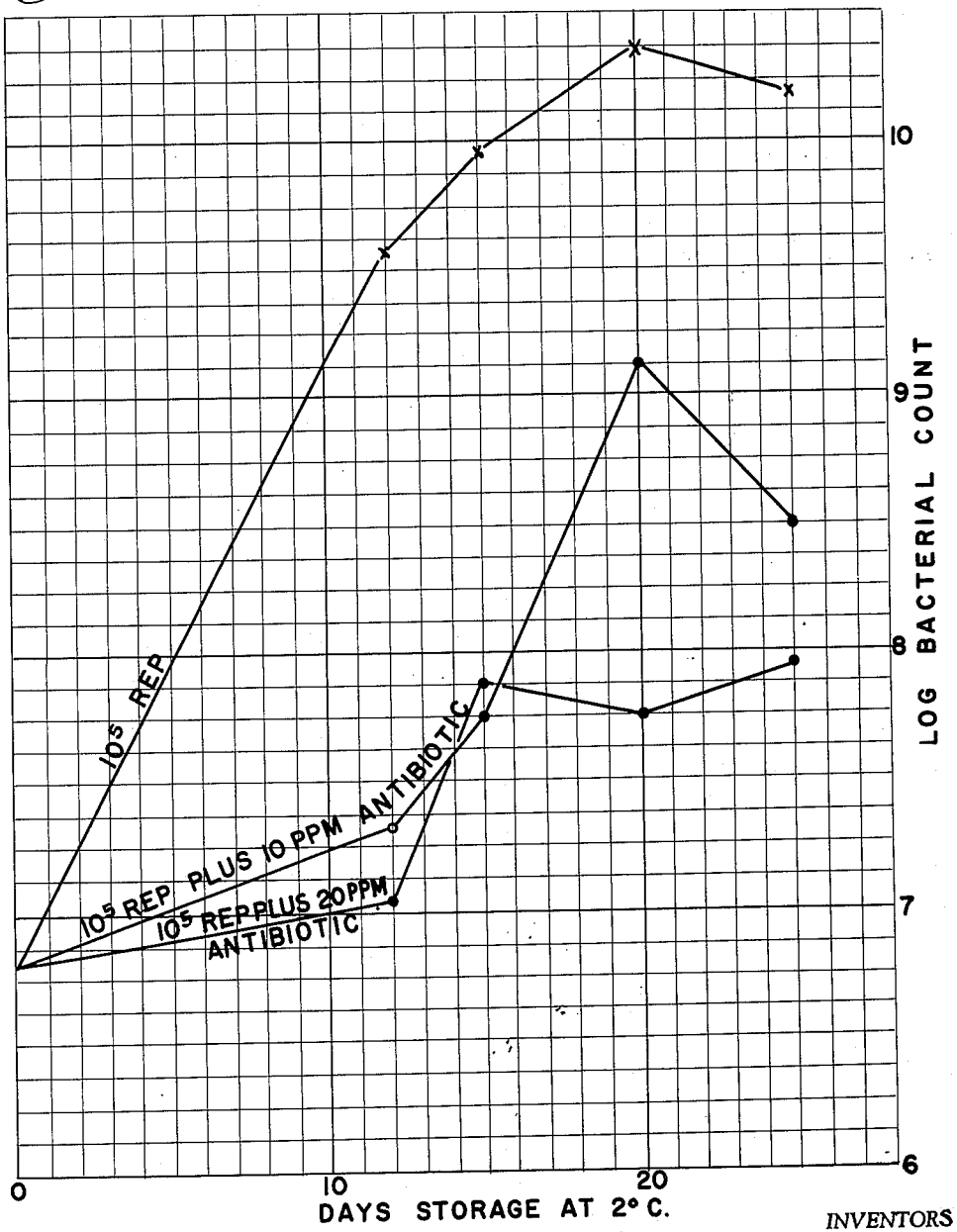

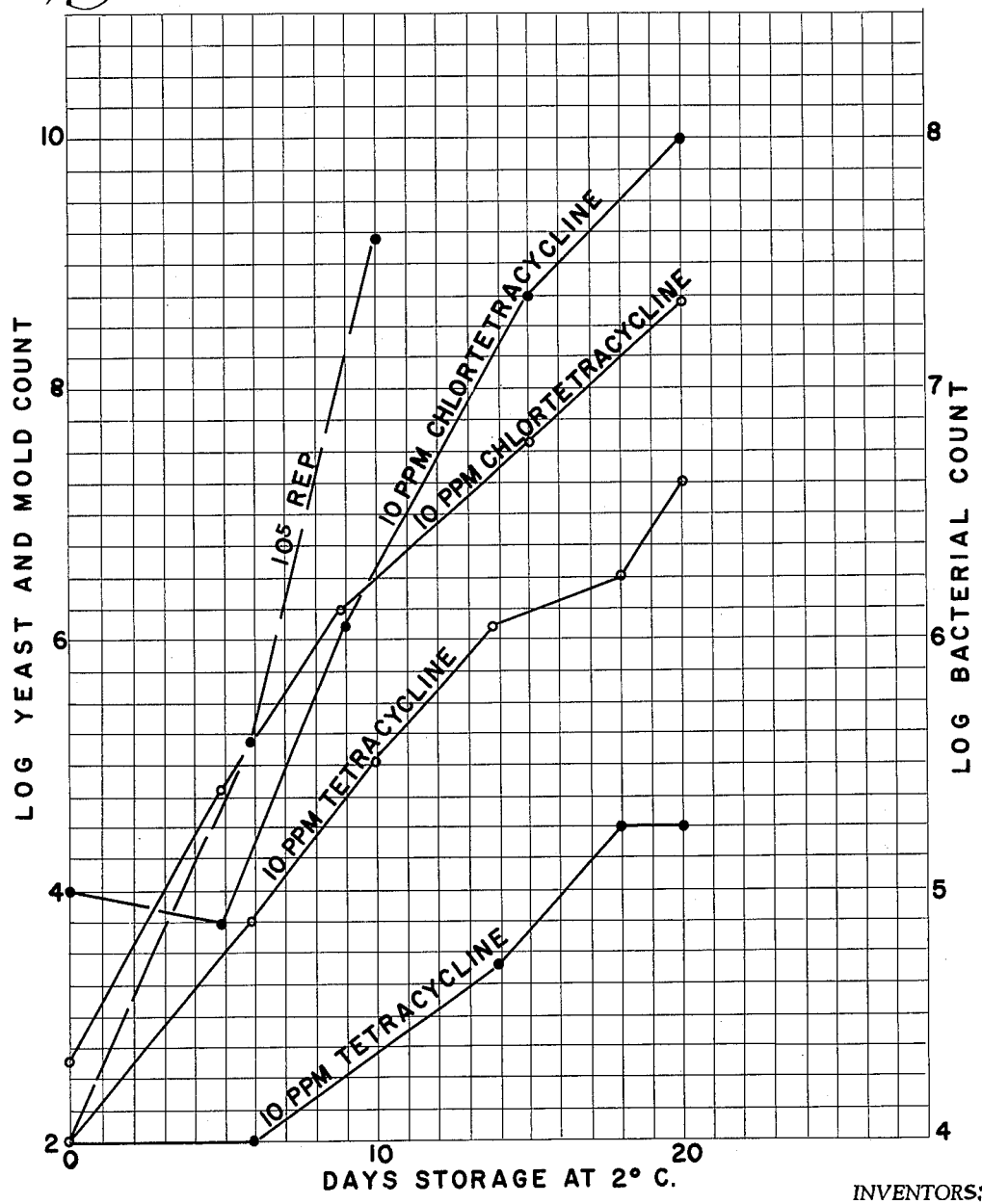

This invention relates to foodstuffs. It has particular reference to a process for the preservation of fresh meats and fish and to the products obtained by that process.

One of the principal objects of this invention is to provide a novel process for treating fresh meats and fish in order to inhibit the growth therein of undesirable spoilage microorganisms. Another object of this invention is to provide meat and fish cuts which remain fresh for extremely long periods under merely the usual refrigerating conditions. A further object is the preservation of fresh meat, including poultry and fish by a method which is quick, involving no long aging periods, and which is inexpensive when carried out on a quantity basis. Other objects and advantages of this invention will be readily apparent from the following detailed description of certain preferred embodiments thereof.

It is known that foods, such as meats and fish, can be helped to remain in a fresh condition for reasonably long periods of time by treatment with antibiotics. Such treatment has been effected by dipping the meat in brine, water or other conventional processing solutions, which contain the antibiotic dissolved or suspended therein. Alternatively, the food may be sprayed with such a solution, or sprinkled with a dry antibiotic-containing powder, or packed in ice containing the antibiotic. Still another method of contact in the case of meats has been post-mortem infusion of the carcass after slaughter, pumping a solution of the antibiotic through the vascular system under pressure. A preferred procedure for meats, disclosed in the copending application by Wrenshall et al., filed November 2, 1956, under Serial No. 619,963, now Patent No. 2,942,982, constitutes intraperitoneally injecting the live animal with the antibiotic and slaughtering the animal as soon as the antibiotic has been distributed throughout the body but before it has been metabolized (usually an interval of 1 to 4 hours).

Despite their unquestioned value in the food preservation field, however, antibiotics per se are not a cure-all. They are most effective with foods which are of high bacteriological quality, and their preservative ability drops appreciably when they are used with meats and fish of poor quality, i.e. having initially high bacterial populations. The function of most antibiotics employed in the food field, e.g. the generally preferred tetracyclines, is to retard the growth of spoilage organisms but not to kill them.

Among the surface contaminants that are able to grow even under the refrigerating conditions usually employed for storing fresh meats and fish are a group of bacteria known as the pseudomonads. These, of which *Pseudomonas geniculata* is the most common species encountered on meats, are characterized by the ability to grow quite rapidly on the surface of meats even at temperatures slightly below 32° F. Extensive growth results in the usual browning, sliming, and musty odor so familiar to all. Any method which would prevent the contamination of meat surfaces with these bacteria, retard their growth, or kill them, would most certainly result in an increased holding time for fresh meats. Work has been conducted in exploring the possibility of using ionizing radiations as food preservatives. These ionizing radiations are definitely lethal when applied at sufficient dosages, and pseudomonads are quite radiation-sensitive. Unfortunately, however, sterilizing doses damage most foods with respect to organoleptic properties. Relatively low doses of ionizing radiations, in the order of 100,000 rep, result in a significant increase in the shelf life without seriously damaging the organoleptic qualities of the meat, but at such low radiation dose levels there are survivors of many bacterial species which still soon effect spoilage.

A novel method has now been devised whereby the storage or shelf life of fresh meats and fish can be extended to a surprising degree. In its broader aspects this new process comprises subjecting the foodstuff to intimate contact with an antibiotic and then to relatively low ionizing radiations. While these two treatment steps may be carried out in either order, it is preferred to employ the antibiotic treatment first, followed by radiation. Thus, when the antibiotic treatment is effected by intraperitoneal injection of a live animal, generally the irradiation step will be second, following slaughter. Alternatively, a carcass may be first irradiated and then contacted with the antibiotic by the infusion technique, or the reverse procedure may be employed. However, it is particularly advantageous to apply the antibiotic, say to meat and poultry cuts and fish fillets, by dipping or spraying techniques, then package the same in a hermetically sealed wrapping, such as polyethylene, and subject the sealed packages to irradiation. These steps may be combined in some instances by incorporating the antibiotic in a packaging film in which the cut or fillet is wrapped before irradiation.

When irradiation is used at "pasteurization" (i.e., $6.5 \times 10^4$ and preferably $10^5$ rep) levels the effectiveness of the treatment is limited by the initial quality of the meat. With meat of better than median quality the shelf life limit obtained is about 15 days when the meat is stored at 2° C. If the meat is of bacteriologically poor quality, 10 days represents the shelf life limit. Antibiotics alone at the level of 1–20 p.p.m., which seems at the present time to be about the preferred range, are even more limited by the level of initial contamination. In heavily contaminated meat they add little to the 5–10 day shelf life of untreated high quality meat. Combined irradiation and antibiosis, on the other hand, achieve much more than the expected effect. The process of the present invention can procure a shelf life of two weeks even for very poor quality meats.

The tetracycline antibiotics (oxytetracycline, tetracycline itself and chlortetracycline) are preferred, because they are effective against many gram-positive and gram-negative bacteria, both aerobic and anaerobic, such as Salmonella, Micrococci and Clostridia. They are fairly stable at low and room temperature but decompose with relative ease at temperatures used in cooking. These antibiotics are non-toxic at the levels and under the conditions employed, of course. They may be used in any of their known, antibacterially active forms, such as the bases or acids per se or salts. For instance, the tetracyclines may be used as the free, amphoteric compounds, as the hydrochlorides, sulfates, phosphates, and other acid salts, or as the sodium, potassium and other metal salts, as well as in the form of various metallic complexes. If desired, other antimicrobial agents may be used in conjunction with the tetracycline antibiotics, but such other agents are not considered essential for the purposes of this invention. As above indicated, generally the amount of antibiotic required is very small, 1–20 p.p.m. in the meat cut or fish fillet being sufficient. For intraperitoneal injection prior to slaughter from 1–10 mg. of oxytetracycline per pound of live weight is normally sufficient, while 2.5–6.0 mg. per pound is a preferred range. Similar proportions are utilized for the other tetracycline antibiotics.

In accordance with the present invention the preservation process is carried out with a source of gamma and/or beta radiation. Gamma irradiation is preferred for treatment of relatively large pieces, such as entire carcasses, since it has a high degree of penetrating power. On the other hand, beta irradiation is extremely rapid, rendering it especially advantageous for surface treatment and for treatment of relatively thin cuts, such as steaks, fillets, and the like.

Suitable sources of gamma radiation are radioactive isotopes, such as cobalt 60, spent fuel rods, fission wastes, and various gases employed in nuclear reactors. However, care should be taken to insure that the radiation, whatever the source, is completely free of neutrons. Suitable sources of beta radiation include the linear accelerator, Van de Graaff generator, resonant transformer, capacitron, and the like.

It will be appreciated that the level of irradiation will vary somewhat, depending upon the particular foodstuff and its condition, among other factors. In most instances at least 65,000 rep should be employed, even with antibiotic treatment, and as much as 500,000 rep is not injurious with certain foodstuffs such as pork. However, this level is not usually desirable in the case of beef, which may undergo detectable color, odor or taste changes above 100,000 rep.

According to a particularly preferred embodiment of the invention, the foodstuff is subjected to treatment with a mixture of the antibiotic and a sorbic acid compound, i.e. sorbic acid, its esters and its salts, and then to irradiation. This combination provides a greatly enhanced effect, prolonging the shelf life of fresh meats, for instance, by at least another week. Examples of these are sorbic acid per se, its well-known salts, like the alkali metal sorbates, and esters thereof with monohydroxy and polyhydroxy alcohols, such as ethyl sorbate, butyl sorbate, sorbitol sorbate, mannitol sorbate, glycerol sorbate, etc. Generally the sorbic acid is employed in the proportions of 500 to 2000 p.p.m.; while 1000-1500 p.p.m., when 1-20 p.p.m. of antibiotic is used, is a preferred range. Other antimycotic agents may be used to replace or supplement the action of the sorbic acid compound.

Following are specific examples of this invention, but it is to be understood that they are given by way of illustration only and not in limitation of the invention.

*Example I*

Two hogs were injected intraperitoneally with 3 mg. per lb. oxytetracycline administered as the hydrochloride. Both animals were slaughtered 2 hours after injection. The injection was made through a 3½ inch, 16 gauge needle that was directed inward through the body wall and inserted to the hub. The antibiotic, dissolved in sterile distilled water, was ready in the syringe that was then attached, and the calculated dose was delivered. The swine, which weighed approximately 200 pounds each, were satisfactorily held by an Iowa hog holder.

Following slaughter, the carcasses were hung at room temperature (80° F.) for two days. Periodic observation showed spoilage at 24 hours in two untreated control carcasses, as evidenced by development of a putrid odor and a greenish hue to the meat; and by 48 hours gas bubbles were forming in the loose tissues. The treated animals, however, remained in excellent condition.

After aging, the oxytetracycline-treated carcasses were chilled to 0° C. and carved into the usual cuts for marketing. These cuts were then loosely wrapped in aluminum foil and irradiated with a gamma source at 66,000 rep. Even after storing at 2° C. for thirty days, the meat cuts remained of excellent bacteriological quality and good appearance.

*Example II*

Ground beef of poor initial quality, i.e. having a high degree of bacterial contamination, was intimately contacted with oxytetracycline in the amount of 10 p.p.m. by mechanically mixing the antibiotic thoroughly through the meat. Gamma radiation at 100,000 rep was then employed on the beef, following the procedure of Example I. The beef was stored at 2° C. and the bacterial flora determined and compared with controls, as shown in the following table. This table demonstrates clearly the significant increase in keeping time of poor quality meat when treated by the process of this invention, as compared with untreated meat or merely irradiated meat or merely antibiotic-treated meat.

| Treatment | Bacteria per gram ($\times 10^3$) | |
|---|---|---|
| | 0 days | 6 days |
| Control | 100,000 | 1,000,000 |
| Irradiated | 300 | 10,000 |
| Oxytetracycline | 60,000 | 1,000,000 |
| Irradiated + Oxytetracycline | 100 | 100 |

The same process was repeated twice again, employing respectively tetracycline and chlortetracycline in lieu of the oxytetracycline. In each instance the same startling difference was noted in the irradiated and antibiotic-treated beef, as compared to the three controls.

*Example III*

Ground lean beef was purchased at a chain supermarket divided into 2 g. patties and wrapped in Visking frankfurter casing. The tetracycline antibiotics in 0.1 ml. sterile distilled water, or 0.1 ml. sterile distilled water only for the controls, were added to the patties. The casing was twisted closed and a loose overwrap of aluminum foil made. The test samples were then irradiated in a cobalt 60 furnace and stored at 2°, or in some cases 10°, 30° and 45° C. Replicates were removed at intervals, disintegrated in a Waring blendor and plated in tryptone-glucose-yeast extract agar or potato dextrose agar with tartaric acid added. Control samples of three types were maintained; untreated, irradiated only, and treated only with the antibiotics.

The meat procured from the chain supermarket ranged in initial bacterial count from $4 \times 10^5$ organisms per g. to over $10^8$ per g. The median and mode counts were both approximately $4 \times 10^6$ organisms per g. Meat at or above this median has a shelf life of 2 to 5 days when stored at 2° C. Below the median count organoleptic spoilage may not be apparent for from 4 to 10 days. Either the antibiotic alone at 1–20 p.p.m., or irradiation alone at $10^5$ rep deferred spoilage until about the seventh day. (This irradiation level of $10^5$ represents the maximum generally obtainable without detectable color, odor and taste changes occurring in the beef.) The untreated meat had spoiled by the third day.

In FIG. I the preservative action of $10^5$ rep alone, and in combination with 10 and 20 p.p.m. oxytetracycline is illustrated. In FIG. II the effects of chlortetracycline and tetracycline when combined with $10^5$ rep are illustrated. Both bacterial and mycotic population changes were followed. The meat lot used in the tetracycline series had the lowest initial contamination of any lot purchased, and this is reflected in a greatly increased bacteriostasis.

*Example IV*

Commercial grade steaks were obtained that averaged $3 \times 10^4$ microorganisms per gram. Sodium sorbate was taken up in a 1:4 propylene glycol-glycerol solution in combination with oxytetracycline. The antibiotic and the sorbate were in such concentration that addition of 0.1 ml. of the solution to 5 g. of meat produced the desired final concentration of preservative per gram of meat (10 p.p.m. of the antibiotic and 1000 p.p.m. sorbate). A 0.1 ml. of the solution containing both preservatives, or oxytetracycline only, or a 0.1 ml. of the propylene glycol-glycerol solution only, for controls, was spread over a 16 square inch section of Pliofilm. A 5 g. sample of steak was then wrapped tightly and heat sealed in the treated wrapper. The samples were irradiated at $10^5$ rep and held in humidified Pyrex casseroles at 2° C. Samples treated with the sorbate plus antibiotic were microbiologically sound in the Pliofilm after 30 days. In both controls and test steaks the meat color had faded; however, in those samples with preservative added the color change was not as severe as in the controls.

Sample lots of asceptically prepared ground beef were treated in the same manner. Microorganisms were not detectable for the first two weeks of storage. In the samples treated with irradiation and antibiotic, spoilage levels of the microbial population were not reached for 35 days. Those samples treated with sorbate, irradiation and antibiotic had, after 47 days, only a small mycotic population.

*Example V*

Fish fillets were dipped for 1 minute in brine containing 25 p.p.m. oxytetracycline. Following this, they were irradiated on each side at 200,000 rep of beta irradiation produced by a 2,000,000 volt resonant transformer. Controls treated only with the antibiotic and only with beta irradiation were also run. The storage life of the fish which had been subjected to both antibiotic and irradiation treatment was significantly greater than that obtained with each form of treatment alone.

What is claimed is:

1. A process for preserving fresh foodstuffs which comprises intimately contacting the foodstuff with from about 1 to 25 p.p.m. of a tetracycline antibiotic and then irradiating it with radiation selected from the group consisting of gamma rays and beta rays at pasteurization levels.

2. The process of claim 1 wherein the antibiotic is oxytetracycline.

3. The process of claim 1 wherein the antibiotic is chlortetracycline.

4. The process of claim 1 wherein the antibiotic is tetracycline.

5. The process of claim 1 wherein the foodstuff is irradiated with gamma radiation at from about 65,000 to 500,000 rep.

6. The process of claim 1 wherein the foodstuff is irradiated with beta radiation.

7. A process for preserving fresh foodstuffs which comprises subjecting the foodstuff to intimate contact with a mixture of from about 1 to 25 p.p.m. of a tetracycline antibiotic and from about 500 to 2000 p.p.m. of a sorbic acid compound and to irradiation selected from the group consisting of gamma radiation and beta radiation at pasteurization levels.

8. A process for treating fresh meats which comprises injecting a live animal with from about 1 to 10 mg./lb. of a tetracycline antibiotic, within about 1 to 4 hours thereafter slaughtering the animal, and subjecting the carcass to gamma radiation at between 65,000 and 500,000 rep.

9. A process for treating fresh meats and fish which comprises subjecting cuts thereof to intimate contact with a mixture of from about 1 to 25 p.p.m. of a tetracycline antibiotic and from about 500 to 2000 p.p.m. of a sorbic acid compound and to gamma radiation at from about 65,000 to 100,000 rep.

10. The process of claim 9 wherein the antibiotic is oxytetracycline.

11. The process of claim 9 wherein the antibiotic is chlortetracycline.

12. The process of claim 9 wherein the antibiotic is tetracycline.

13. A process for the preservation of meat which comprises applying thereto an antibiotic of the tetracycline series in a concentration of from 1 to 10 parts per million, enclosing the meat in a container, and subjecting the so-treated meat to a dosage of ionizing radiations of about 100,000 rads.

References Cited in the file of this patent

UNITED STATES PATENTS

| | | |
|---|---|---|
| 1,981,583 | Craig | Nov. 20, 1934 |
| 2,379,294 | Gooding | June 26, 1945 |
| 2,786,768 | Deatherage | Mar. 26, 1957 |
| 2,832,689 | Proctor et al. | Apr. 29, 1958 |

OTHER REFERENCES

"Food Engineering," August 1953, p. 184, article entitled Aureo, Oleo, and C. Rays For Better Meats, Fish.

"Applied Microbiology," March 1954, pp. 88 to 94, inclusive, article entitled The Use of Antibiotics in Meat Processing, by H. H. Weiser et al.

"Food Engineering," May 1954, p. 207, article entitled Tokyo "Radiating" Fish.

"Food Manufacture," October 1954, p. 398, article entitled Irradiation of Food.

"Food Engineering," May 1956, pp. 57 and 178, article entitled Irradiation and Antibiotics May Team Up to Preserve Meat.

UNITED STATES PATENT OFFICE
CERTIFICATE OF CORRECTION

Patent No. 3,057,735                      October 9, 1962

Robert Crittenden Ottke et al.

It is hereby certified that error appears in the above numbered patent requiring correction and that the said Letters Patent should read as corrected below.

In the drawings, Sheets 1 and 2, lower right-hand corner, strike out "Charlton Lewis Wrenshall, John Raymond McMahan, and William Ronald Chesbro".

Signed and sealed this 25th day of June 1963.

(SEAL)
Attest:

ERNEST W. SWIDER
Attesting Officer

DAVID L. LADD
Commissioner of Patents